(12) United States Patent
Hsu et al.

(10) Patent No.: US 6,485,107 B2
(45) Date of Patent: Nov. 26, 2002

(54) WHEEL COVER ASSEMBLY

(76) Inventors: Long-Chuan Hsu, No. 39, Sha Luen, Chung Sha Vill. an din Hsiang, Tainan Hsien (TW); Lung-Hung Hsu, No. 46, Sha Luen, Chung Sha Vill., an din Hsiang, Tainan Hsien (TW); Gary E. Adamson, 53395 Pheasant Ridge Dr., Bristol, IN (US) 46507

( * ) Notice: Subject to any disclaimer, the term of this patent is extended or adjusted under 35 U.S.C. 154(b) by 0 days.

(21) Appl. No.: 09/922,160

(22) Filed: Aug. 6, 2001

(65) Prior Publication Data

US 2002/0008421 A1 Jan. 24, 2002

Related U.S. Application Data

(63) Continuation-in-part of application No. 09/624,034, filed on Jul. 24, 2000, now abandoned.

(51) Int. Cl.[7] .................................................. B60B 7/14
(52) U.S. Cl. .............................. 301/37.371; 301/37.376
(58) Field of Search ....................... 301/37.101, 37.371, 301/37.372, 37.376, 37.106, 37.102, 108.4

(56) References Cited

U.S. PATENT DOCUMENTS

| 4,606,582 | A | * | 8/1986 | Warren |  |
|---|---|---|---|---|---|
| 5,031,965 | A | * | 7/1991 | Buerger |  |
| 5,222,785 | A | * | 6/1993 | Green |  |
| 5,277,478 | A | * | 1/1994 | Wright |  |
| 5,346,288 | A | * | 9/1994 | Hodge et al. |  |
| 5,503,465 | A | * | 4/1996 | Price et al. | 301/37.371 |
| 5,505,525 | A | * | 4/1996 | Denton |  |
| 5,669,672 | A | * | 9/1997 | Wright et al. | 301/37.371 |
| 5,722,735 | A | * | 3/1998 | Wright et al. |  |
| 6,033,033 | A | * | 3/2000 | Sheu |  |
| 6,254,195 | B1 | * | 7/2001 | Plumer | 301/37.371 |
| 6,419,327 | B1 | * | 7/2002 | Renshaw | 301/37.376 |

* cited by examiner

Primary Examiner—Russell D. Stormer
(74) Attorney, Agent, or Firm—Rosenberg, Klein & Lee

(57) ABSTRACT

A wheel cover for a vehicle wheel including a main cover and an axle cover. The main cover is attached to the wheel using the lug bolts. A plurality of inter-screws are threadedly fastened a portion of the lug bolts which extends beyond the lug nuts. The cover includes a plurality of holes which align with the inter-screws, and a plurality of integration bolts are inserted through the holes and into threaded openings in the inter-screws to fasten the cover to the wheel. The structure of the cover is such that several covers may be nested and stacked to conserve storage space.

2 Claims, 11 Drawing Sheets

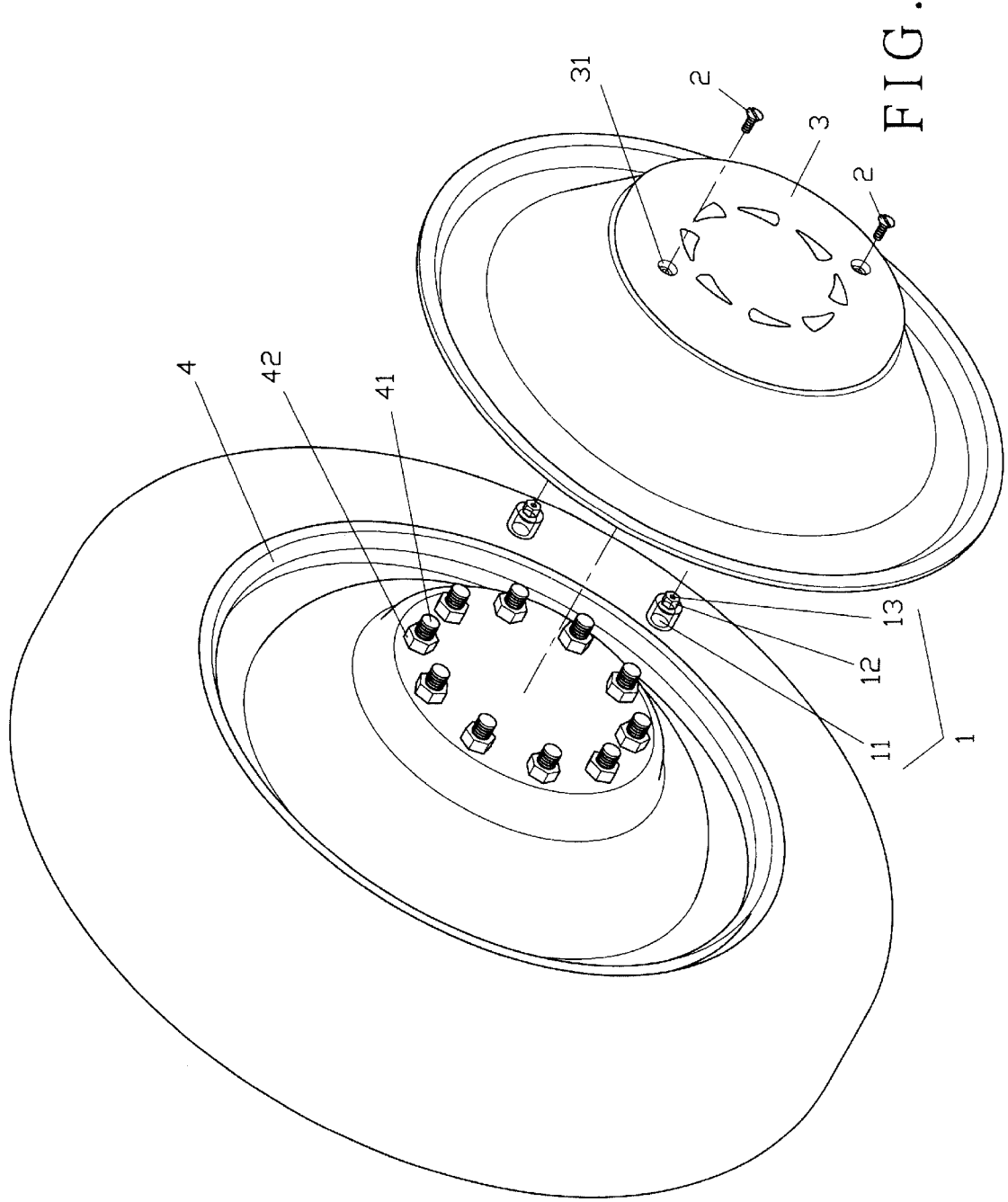

WHEEL COVER ASSEMBLY

This application is a continuation-in-part of our application filed Jul. 24, 2000, Ser. No. 09/624,034 now abandoned.

BACKGROUND OF THE INVENTION

1. Field of the Invention

This invention relates to the field of an automobile wheel cover assembly, and more particularly to a wheel cover assembly having a structure where wheel cover assemblies can slack onto each other.

2. Prior Art

Many large vehicles, such as trailers or trucks have wheel covers used as decoration. The wheel cover is generally attached to the wheel. FIG. 10 shows a prior art wheel cover design. A wheel A is fixed to the wheel axle by wheel bolts A1 and nuts A2. However, the nuts A2 must be loosened first when mounting a wheel cover B and then the wheel bolts A1 are passed through holes B1 of the wheel cover B. Finally, the nuts A2 are threaded onto the bolts A1 to secure the wheel cover onto the wheel A.

It's obvious that in mounting the wheel cover B, the nuts A2 need to be taken off first. This step, taking off and replacing the nuts on the wheel, is difficult due to the balancing adjustment of each nut, as the wheel axle must equally connect and contact the wheel, which means each nut A2 must be equally tightened to the bolts A1. So, an adjustment procedure is always required after loosening the nuts A2.

Further, wheel covers are consumer products which need to be replaced after a period of time, and the convenience of the wheel cover is very important.

A further reason is that the storage of wheel covers requires a large space, which is not effective in cost.

SUMMARY OF THE INVENTION

It is the primary object of the present invention to provide a wheel cover assembly having a structure where wheel cover assemblies can stack onto each other, for saving storage space.

BRIEF DESCRIPTION OF THE DRAWINGS

FIG. 3-1 is a view of stacked wheel covers of the first embodiment.

DETAILED DESCRIPTION OF THE PREFERRED EMBODIMENTS

Figure 2:
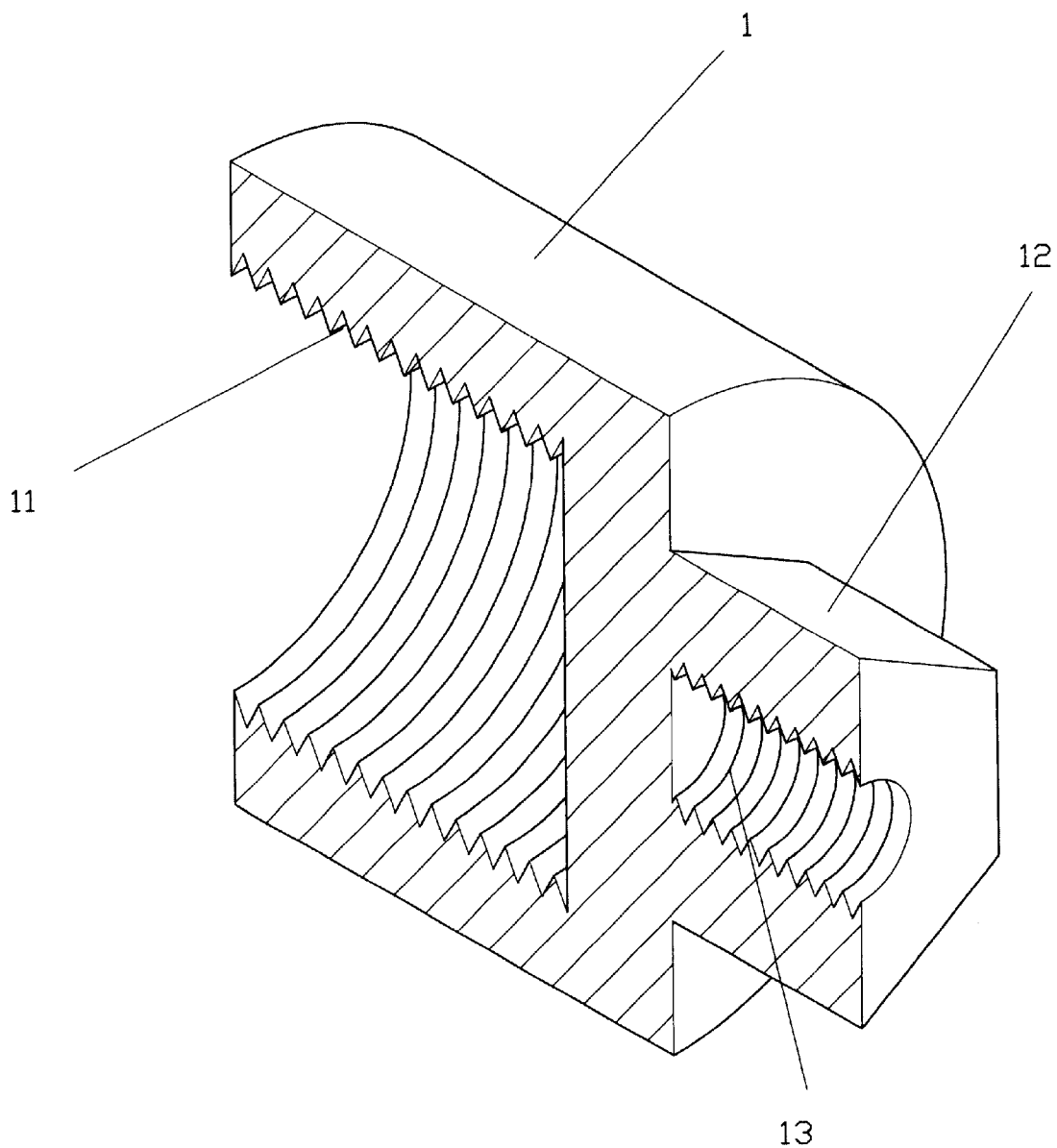
FIG. 2 is a cross-sectional view of the inter-screw.
Figure 3:
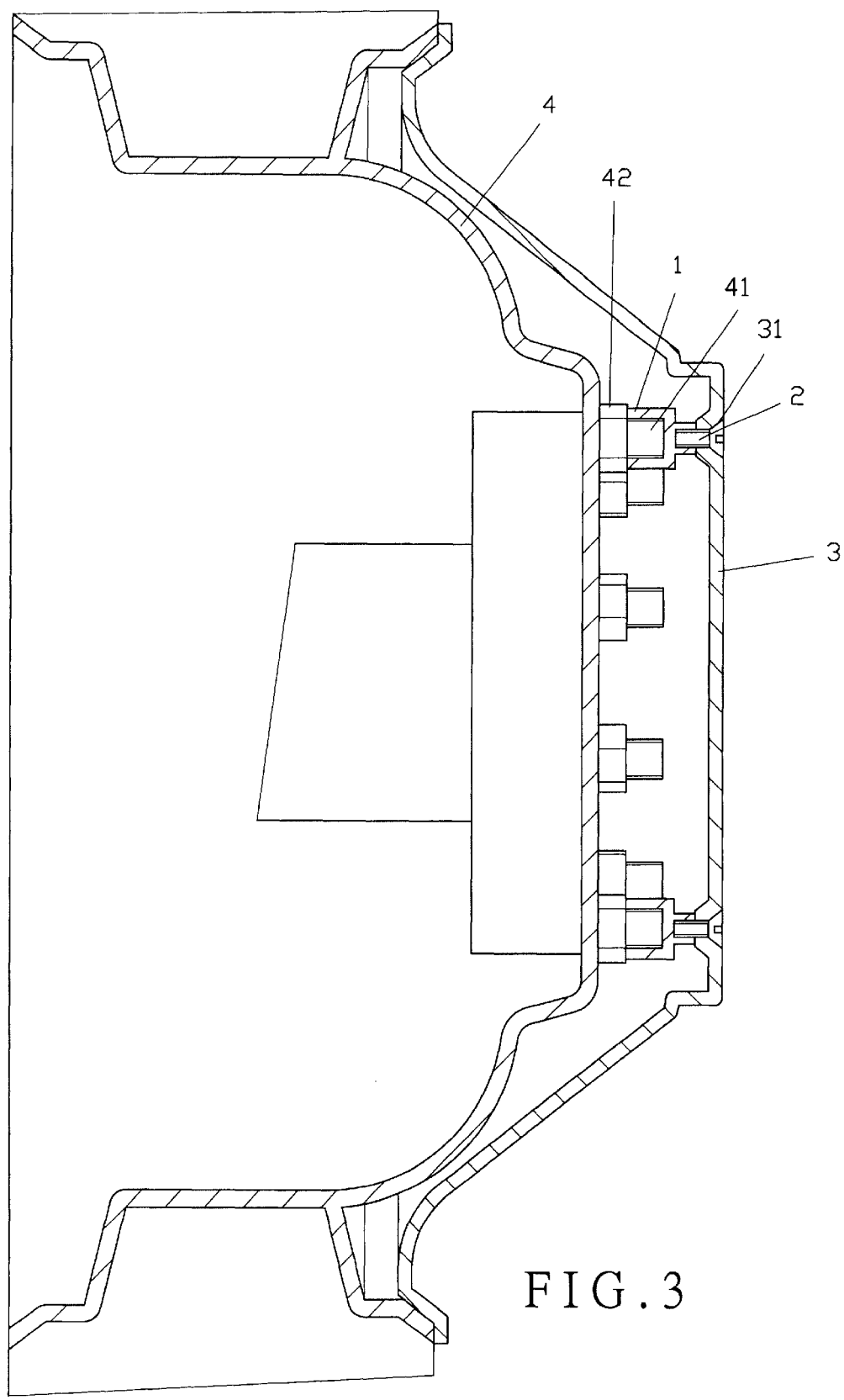
FIG. 3 is a cross-sectional view of the first embodiment.
Figures 1, 3:
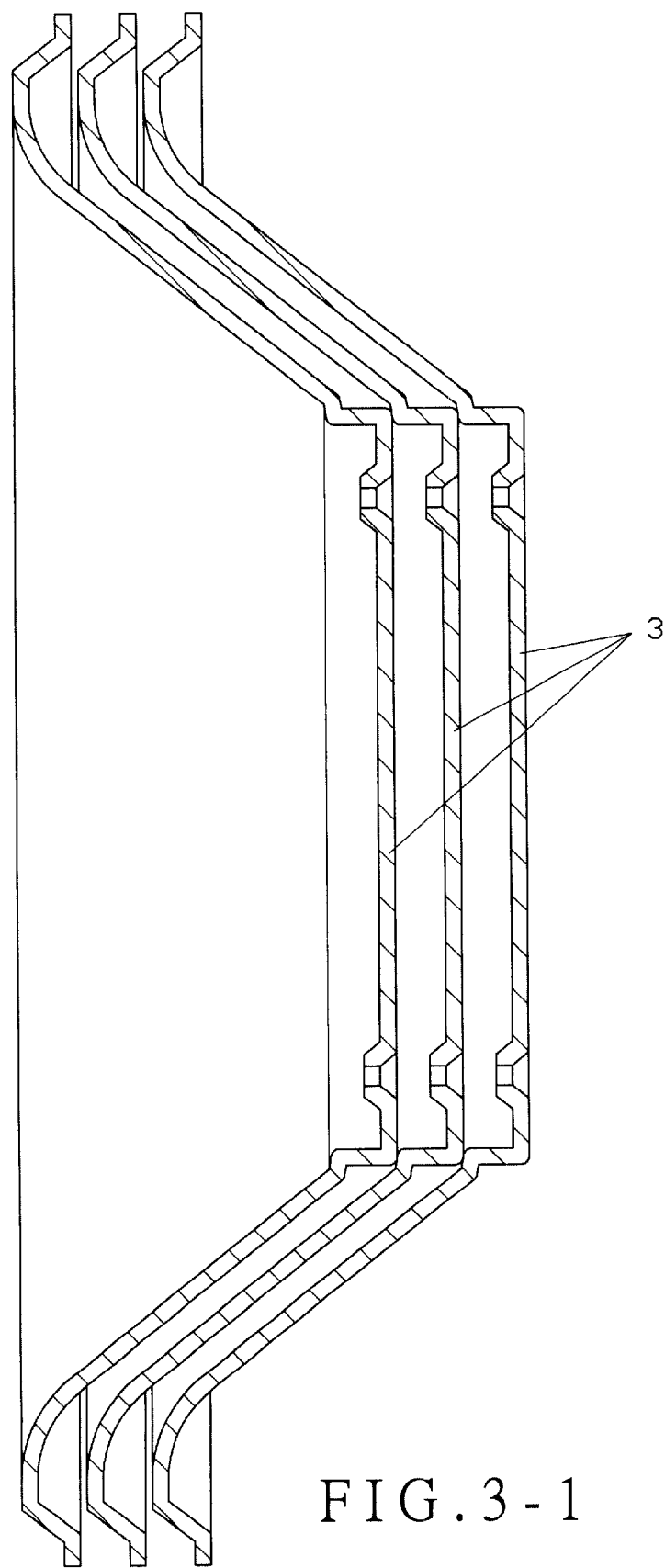
FIG. 1 is a perspective view of the first embodiment.

Referring to FIG. 1 and FIG. 2, an attachment method for a wheel cover comprises inter-screws 1, integration bolts 2 and a wheel cover 3.

Each inter-screw 1 has a polyhedron portion 12 for threading purpose on the upper portion of the inter-screw 1, a bottom aperture 11 having inner thread therein adapted to receive the wheel bolt 41, and a top aperture 13 having inner thread therein adapted for the integration screw 2 to insert therethrough.

The wheel cover 3 comprises through holes 31 for insertion of the integration screws 2. The wheel cover 3 also has a structure enabling a plurality of wheel covers 3 to stack onto each other.

FIG. 3 shows a pair of inter-screws 1 secured on the wheel bolts 41 opposing each other on the wheel 4 (the inter-screws 1 are equally spaced at 120 degrees from each other when three inter-screws 1 are used). The wheel cover 3 is therefore secured on the wheel 4 by inserting the integration bolts 2 through the through holes 31 and threadedly engaging bolts 2 with the top apertures 13 of the inter-screws 1. Thus, by means of the inter-screws 1 the wheel cover 3 may be mounted on or dismounted from the wheel 4 without necessity of removing the wheel nuts 42.

FIG. 3-1 shows a view of the wheel covers 3 stacked onto each other to save the storage space.

Figure 4:
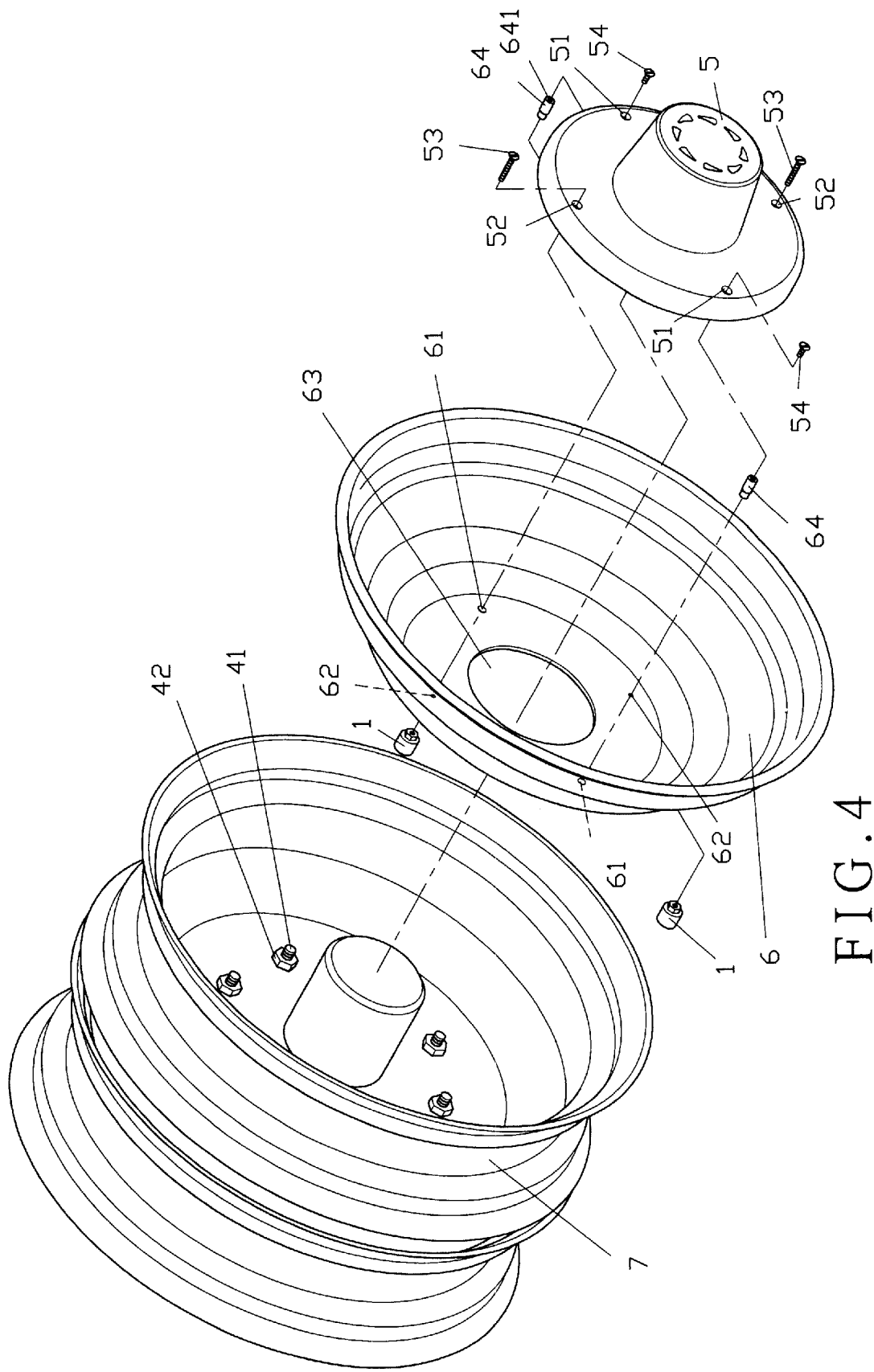
FIG. 4 is a perspective view of the second embodiment.

Referring to FIG. 4, such shows an example of applying the preset invention on a rear wheel. The axle cover 5 is formed as a stackable structure. At least two through holes 51 and 52 are formed around the edge thereof. The wheel cover 6 comprises through holes 61 and 62 corresponding to die through holes 51 and 52. An axle hole 63 is also formed in the center portion or the wheel cover 6. Attachment hardware 64 having a fixing aperture 641 is placed into the through hole 61 of the wheel cover 6 by means of a weld or rivet joint.

Figure 5:
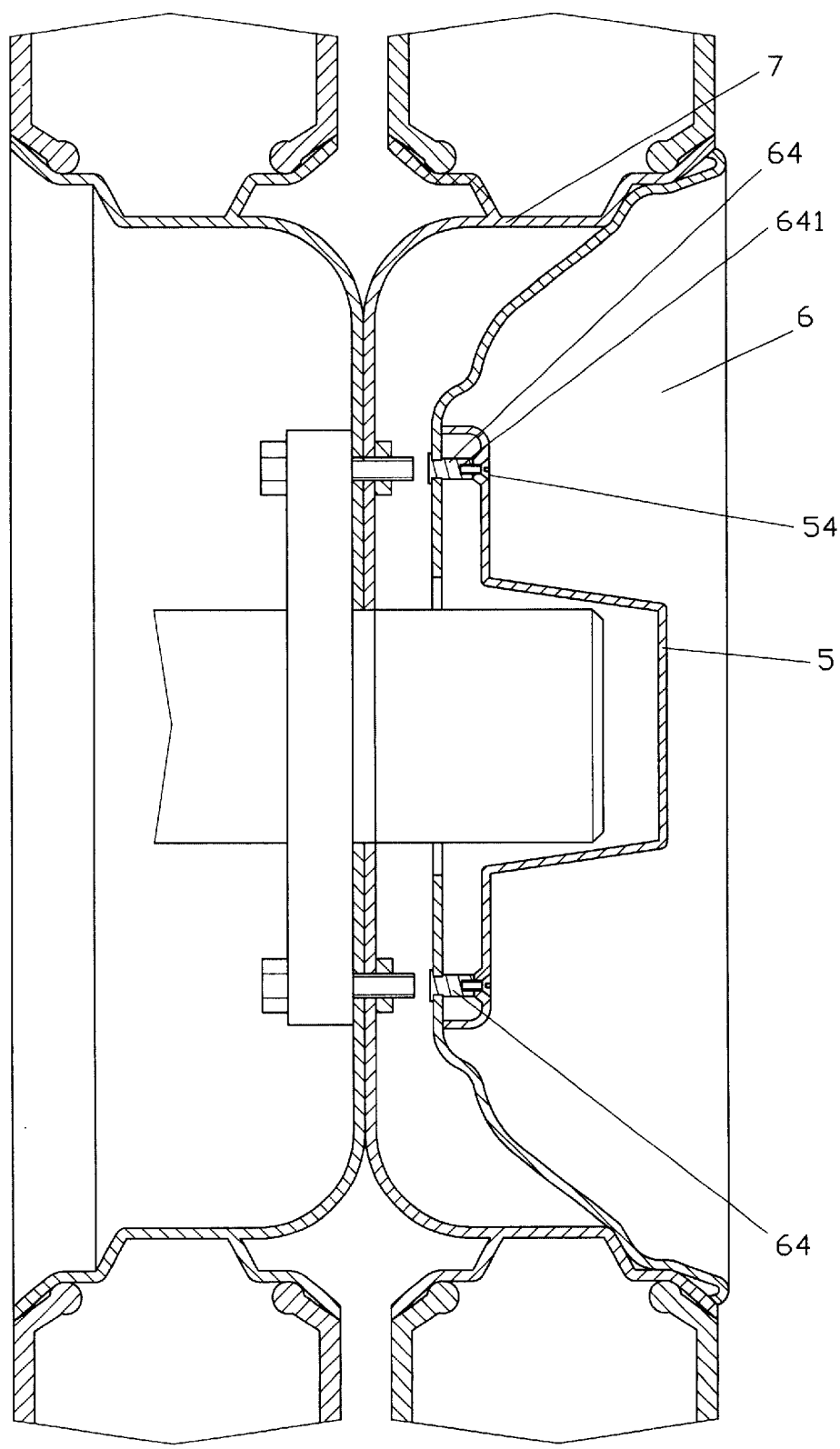
FIG. 5 is a cross-sectional view of the second embodiment.
Figure 6:
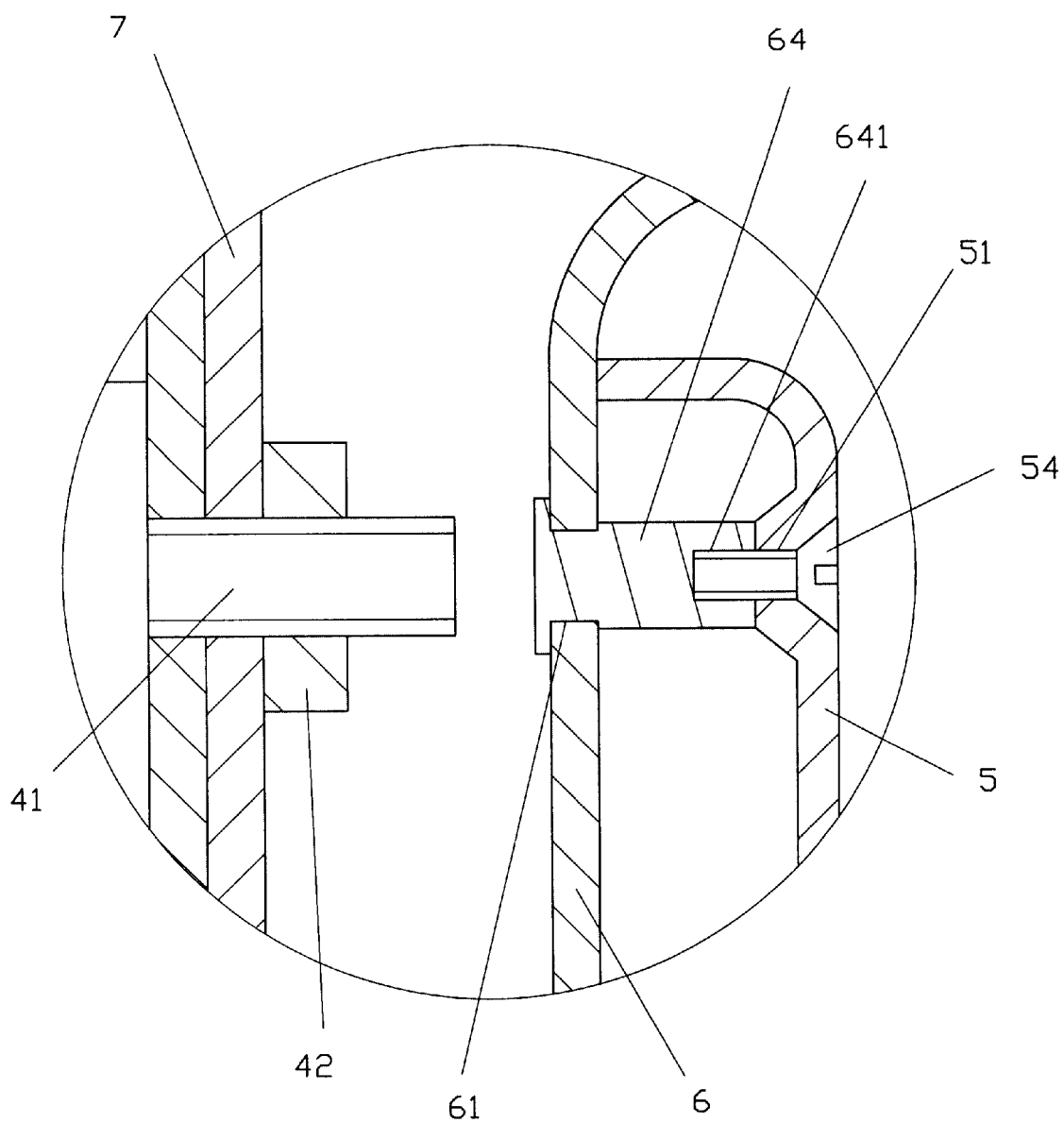
FIG. 6 is an enlarged, partially sectioned, view of FIG. 5.

Referring flow to FIG. 5 and FIG. 6, the axle cover 5 is secured to the fixing aperture 641 of the attachment hardware 64 of the wheel cover 6 with a bolt 54, whereas the through holes 52 are aligned with the through holes 62.

Figure 7:
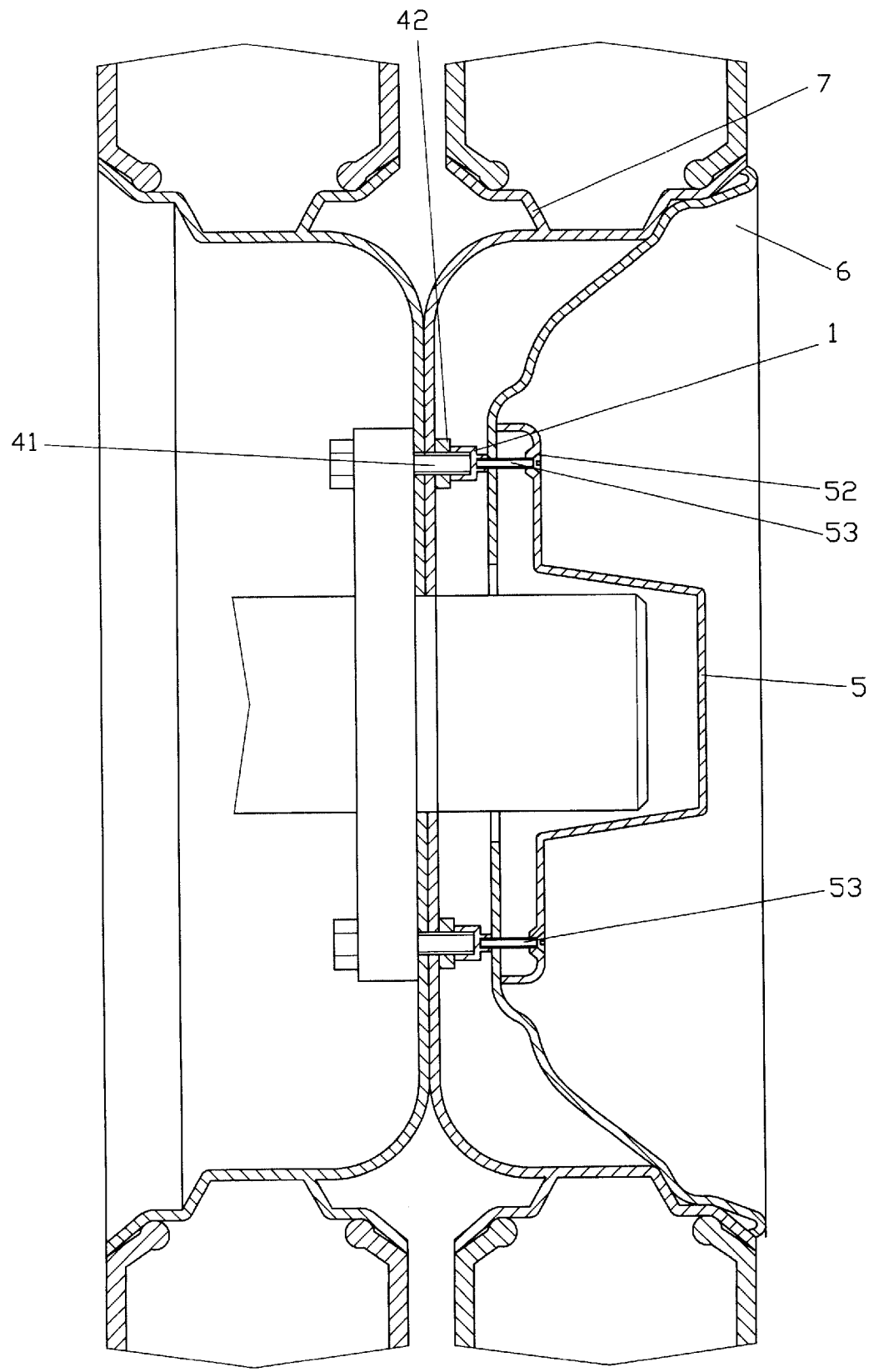
FIG. 7 is another cross-sectional view of the second embodiment.
Figure 8:
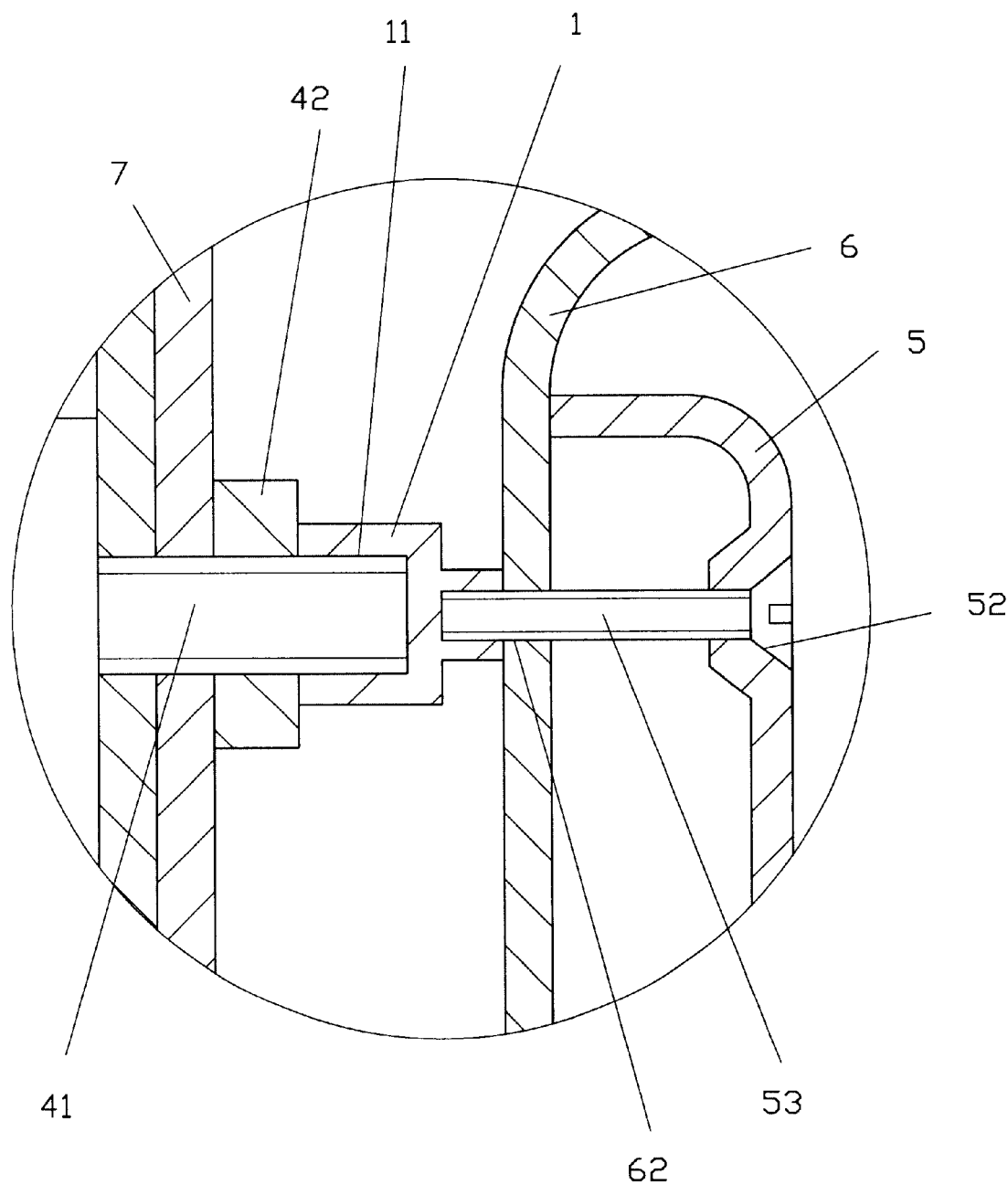
FIG. 8 is an enlarged, partially sectioned, view of FIG. 7.

FIG. 7 and FIG. 8 show assembly of the wheel cover 6, wherein the bottom apertures 11 of the inter-screws 1 are installed onto the wheel bolts 41 securing the wheel 7. Integration screws 53 are inserted through the through holes 52 and the through holes 62, and threaded into the inter-screws 1 to secure the axle cover 5 and the wheel cover 6 onto the inter-screws 1. In this way, the wheel cover 6 can be mounted on the wheel 7 without the necessity of first loosening the wheel nuts 42 from the wheel bolts 41.

Figure 9:
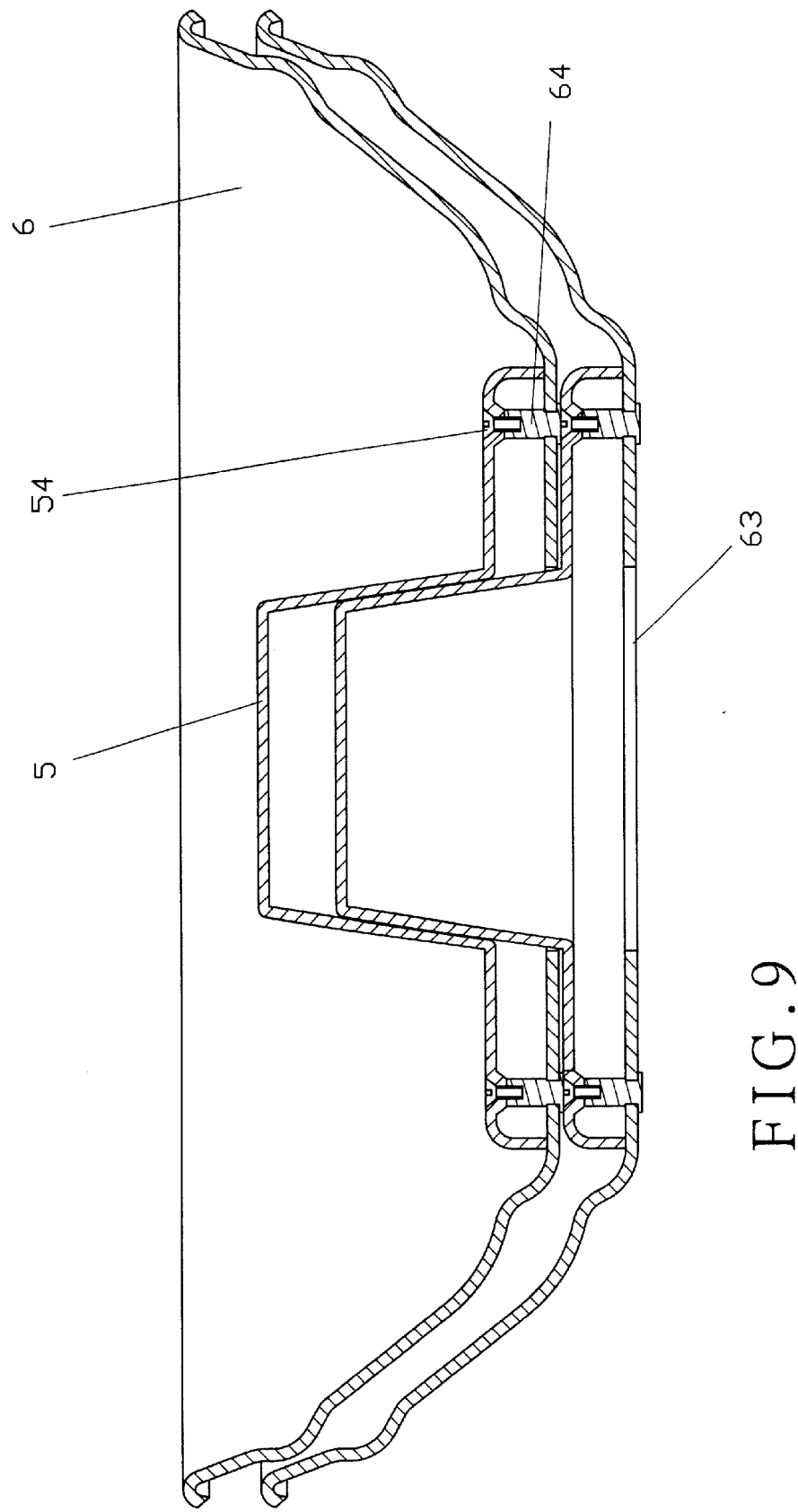
FIG. 9 is a view of stacked wheel covers of the second embodiment.
Figure 10:
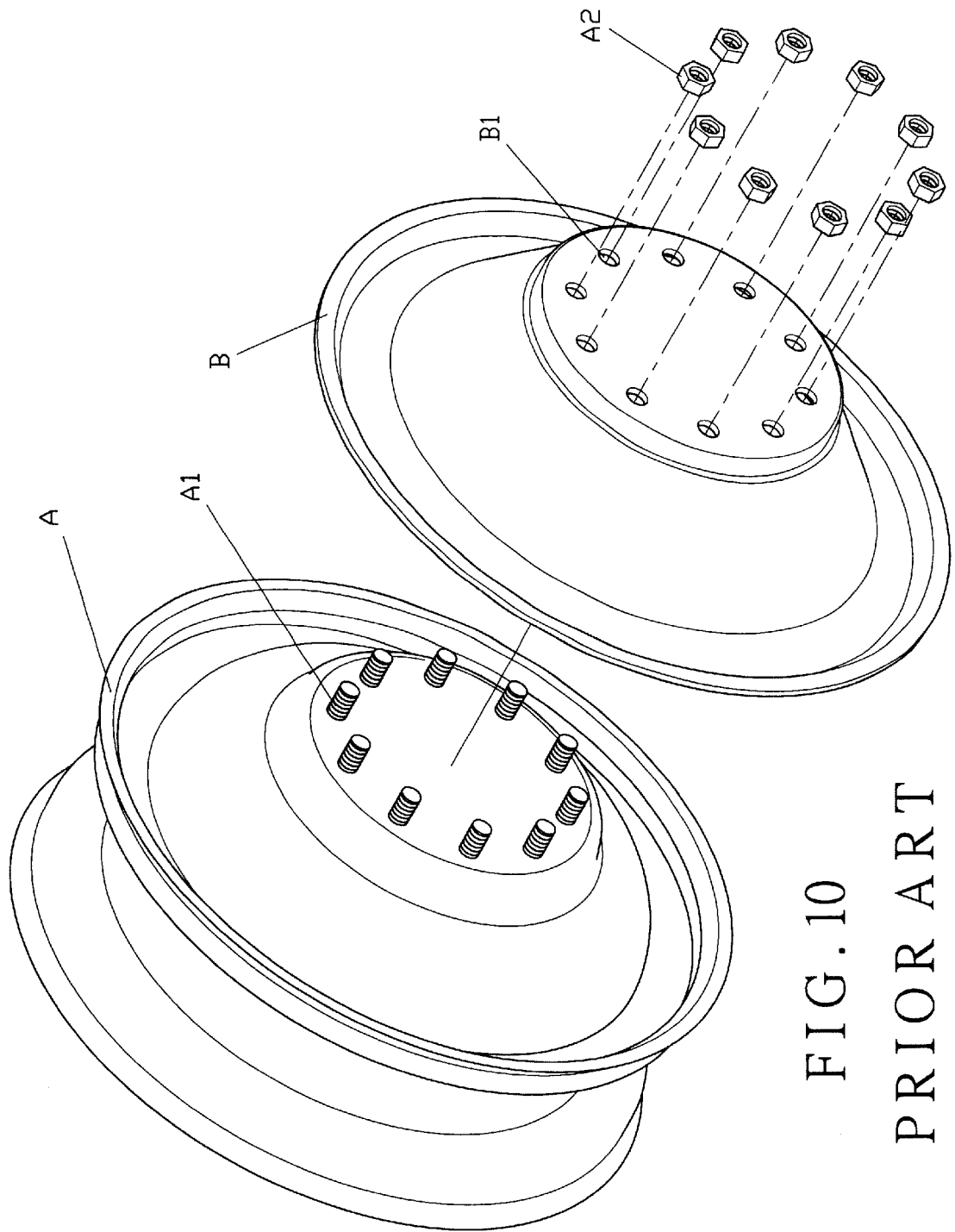
FIG. 10 is a perspective view of a prior art wheel cover assembly.

Referring to FIG. 9, the axle cover 5 is united into the wheel cover 6 by connecting the attachment hardware 64 ad screws 54 together. To stack the wheel covers 6, each with the axle cover 5, the axle cover 5 of one wheel cover 6 may be inserted into the axle hole 63 of another wheel cover 6. The upper wheel cover 6 sits on the lower wheel cover 6 to save storage space and provide ease of transport.

It's understood that the above-described embodiment is merely illustrative of a possible specific embodiment which may present the main principles of the invention. Other arrangements may readily be devised in accordance with these principles by those skilled in the art without departing from the scope and spirit of the invention.

We claim:

1. A wheel cover assembly for mounting on a wheel of a vehicle, the wheel being secured to an axle of the vehicle by a plurality of wheel nuts respectively engaged to a plurality of wheel bolts, said wheel cover assembly comprising:

a plurality of inter-screws, each of said inter-screws having a first end respectively threadedly engaged to a portion of corresponding one of the wheel bolts extending beyond the wheel nut engaged thereto;

a wheel cover overlaying the wheel, said wheel cover having a plurality of through holes formed therein in respective aligned relationship with said plurality of inter-screws; and, a plurality of integration bolts respectively passing through said through holes of said wheel cover and being threadedly engaged with a second end of a respective inter-screw for securing said wheel cover to the vehicle.

2. The wheel cover assembly as recited in claim 1, further comprising an axle cover removably coupled to a central portion of said wheel cover.

* * * * *